United States Patent Office 3,634,423
Patented Jan. 11, 1972

3,634,423
THIOCARBAMOYLALKYLAMINO-s-TRIAZINE
Werner Schwarze, Leerbachstrasse 117, Frankfurt am Main, Germany, and Wolfgang Weigert, Am Aussichtsturm 28, Offenbach am Main, Germany
No Drawing. Filed Mar. 24, 1969, Ser. No. 810,036
Claims priority, application Germany, Mar. 22, 1968,
P 17 70 027.5
Int. Cl. C07d 55/20
U.S. Cl. 260—249.8        5 Claims

ABSTRACT OF THE DISCLOSURE

Substituted s-triazine compounds of the formula

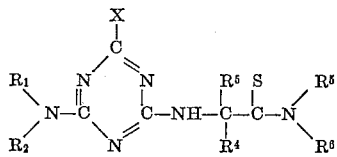

wherein

X is halogen, $N_3$, lower alkoxy or lower alkylmercapto;
$R^1$ and $R^2$ are the same or different and are hydrogen, lower straight-chain or branched alkyl, lower straight-chain or branched alkenyl, lower straight-chain or branched substituted alkyl or lower straight-chain or branched substituted alkenyl;
$R^3$ and $R^4$ are the same or different and are straight-chain or branched alkyl or alkenyl having from 1 to 8 carbon atoms or are aralkyl and wherein
$R^3$ and $R^4$ may also be interconnected to form a 5 to 7 member ring and wherein either
$R^3$ or $R^4$ may also be hydrogen; and
$R^5$ and $R^6$ are the same or different and are lower alkyl or hydrogen.

The compounds of the reaction are strong herbicides of a highly selective nature.

The invention also comprises a process of making the compounds wherein a cyanuric chloride is reacted with α,α-disubstituted-aminoacetic acid-thioamide in the medium of an inert organic solvent followed by recovery of the formed precipitate.

BACKGROUND OF THE INVENTION

The invention relates to substituted s-triazine compounds and their use as plant growth modifiers, in particular herbicides.

Substituted bis-alkyl-aminotriazines are known, and some of them have found use as herbicides. Examples are:

2,4-bis-ethylamino-6-chloro-s-triazine
2-ethylamino-4-i-propylamino-6-chloro-s-triazine.

However, in contrast to these compounds, there is no, or only a very limited, heribicide action in triazine compounds that are substituted by an aminoacetic acid-amide group. For instance, the compounds of the formula

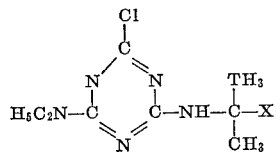

II in which X is COOH or $CONH_2$ have no herbicidal action.

It is therefore an object of the present invention to provide for aminoacetic acid or aminoacetic acid-amide substituted triazines which are useful as modifiers of plant growth, in particular herbicides.

It is an important general object of the invention to provide strong herbicides that have a highly selective action and show little persistence in the ground.

SUMMARY OF THE INVENTION

These objects are met by substituted s-triazine compounds of the formula

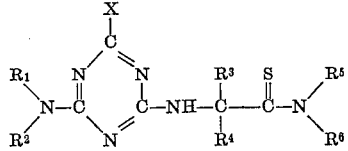

wherein

X is halogen, $N_3$, lower alkoxy or alkylmercapto;
$R^1$ and $R^2$ are the same or different and are hydrogen, lower straight-chain or branched alkyl, lower straight-chain or branched alkenyl, lower straight-chain or branched substituted alkyl or lower straight-chain or branched substituted alkenyl;
$R^3$ and $R^4$ are the same or different and are straight-chain or branched alkyl or alkenyl having from 1 to 8 carbon atoms or are aralkyl and wherein
$R^3$ and $R^4$ may also be interconnected to form a 5 to 7 member ring and wherein either $R^3$ or $R^4$ may also be hydrogen; and
$R^5$ and $R^6$ are the same or different and are lower alkyl or hydrogen.

The compounds of the reaction are strong herbicides of a highly selective nature.

DESCRIPTION OF THE PREFERRED EMBODIMENTS

As has been pointed out before, the amino acid-amide-substituted triazines such as shown in Formula II above, wherein X is COOH or $CONH_2$, have substantially no herbicidal action.

It was therefore surprising that s-triazines of the general type just referred to wherein a tertiary carbon atom is attached to an amino group and wherein a thioamide group is directly attached to the tertiary carbon, are strong herbicides. For instance, if X is $CSNH_2$, compound which is an excellent herbicide is obtained.

Thus, the thiocarbamoylamino-s-triazines in general have strong and selective herbicide properties, contrary to the corresponding carbamoyl- and carboxy- alkyl- amino-s-triazines.

The reference in the specification, as in the claims, to lower groups is to be understood to include groups having from one to six carbon atoms, and preferably having from one to four carbon atoms.

The preferred compounds of the invention are those in which X is halogen, and particularly is chlorine. The second preference comprises those compounds wherein X is lower alkoxy or lower alkylmercapto. Among the latter there are preferred methoxy and methylmercapto substituted compounds.

Possible substitutions on the alkyl and alkenyl groups in the radicals identified as $R^1$ and $R^2$ may be halogen, OH, CN, lower alkoxy or lower alkylmercapto. If the substitution is halogen, the chlorine is again the preferred substituent.

In the case of the radicals identified as $R^5$ and $R^6$, these radicals preferably are hydrogen.

PROCESS OF MAKING THESE COMPOUNDS

The compounds of the invention may be formed by different methods.

The introduction of a thiocarbamoylalkylamino group, for instance, can be effected by reacting cyanuric chloride with the α,α-substituted amino-acetic acid-thioamides. The latter may be obtained by hydrolysis of substituted imidazolidenethione-4, as further described by Asinger, W. Schafer, H. Kersten and A. Saus ("Monatshefte fuer Chemie" 98, 1843–1851 (1967)). The reaction is as follows:

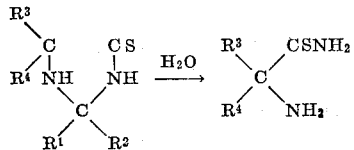

It is noted that thionamides of the following structure have already been described:

| $R^3$ | $R^4$ | M.P. (° C.) |
|---|---|---|
| $CH_3$ | $CH_3$ | 109 |
| $CH_3$ | $C_2H_5$ | 103–105 |
| $CH_3$ | $1-C_3H_7$ | 99 |
| H (cyclohexyl) | | 169–170 |

The synthesis of the aminoacetic acid-thioamides can be effected in a similar manner. The starting product, imidazolidinethione-4, can be obtained by the methods described by H. T. Burcherer and W. Steiner, "Prakt. Chemie" 140, 308 (1934).

The reaction of the aminoacetic acid-thioamide with cyanuric chloride can be effected by processes previously described for the reaction with amines. The introduction of the second amino group into the triazine molecule can likewise be effected in a manner similar to previously described methods; see J. T. Thurston and coworkers, "Jour. Am. Chem. Soc." 73, 2981 (1951).

The corresponding alkoxy and alkylmercapto triazines can then be obtained by reacting the 2-alkylamino-4-thiocarbamoyl-alkylamino-6-halogenotriazine with an alcohol or a mercaptane in the presence of acid receptors.

It is also possible to proceed by reacting the alkoxy or alkylmercapto-cyanoalkylaminotriazine with hydrogen sulfide in the presence of strong and weak bases, for instance in the presence of pyridine or triethylamine. In this case one obtains the unsubstituted thioneamides. By treating cyanoalkylaminotriazine with hydrogen sulfide in pyridine in the presence of a primary amine it is possible to obtain the alkylated thioneamide derivatives.

Alkylmercapto derivatives of the thiocarbamoylalkyl-amino-s-triazines can also be obtained from chlorocyano-alkylamino-s-triazines, which are substituted as desired for the final product and which are treated with hydrogen sulfide in pyridine. There are thus obtained the 2-alkylamino - 4 - thiocarbamoylalkylamino - 6 - mercapto-s-triazines, which subsequently can be converted to the corresponding 6-alkylmercapto-s-triazines, for instance with dimethylsulfate in the presence of alkali.

The azido-derivatives defined in the claims are obtained, however, by reacting the halogenotriazines with an alkaliazide in dimethylformamide or dimethylsulfoxide or, preferably, are obtained from the corresponding quaternary compound by reaction with one of the desired azides in water.

COMPOSITIONS INCLUDING THE COMPOUNDS OF THE INVENTION

The compounds of the invention may be used in solution.

Suitable solvents are, for instance, the following:

alcohols
ketones
hydrocarbons
halogenated hydrocarbons such as chloronaphthalene
mineral oils such as diesel fuel
vegetable oils or mixtures of these several materials.

The compounds of the invention can also be used on solid carrier materials. Examples of such carrier materials are clay, kaolin, diatomaceous earth, bentonite, talcum, finely ground calcium carbonate, charcoal, sawdust, etc.

The effective agents can be mixed in dry form with the carrier materials. However, they can also be applied to the carrier materials as solutions or emulsions or can be mixed with the carrier materials in this form subsequent to drying of the mixture.

In order to improve the adherence of the effective agents on the carrier materials, conventional adhesives may be used such as glue, casein, alginic acid and similar materials.

It is, finally, also possible to mix the compounds of the invention, if desired, together with carrier materials, with emulsifying agents and stabilizers, for instance to form a paste or a powder which then may be set up with water to form a suspension.

Suitable cross-linking agents, emulsifiers and stabilizers are anionic, cationic or non-ionic materials of the conventional types, such as Turkey red oil, fatty acid salts, alkyl-arylsulfonates, secondary alkylsulfates, resin acid salts, polyethylene ethers of fatty alcohols, fatty acids or fatty amines, quaternary ammonium compounds, ligninsulfone acid, saponin, gelatin, casein. These additives may be used singly or as mixtures of different additives.

SPECIFIC COMPOUNDS

The following are specific compounds coming under the general Formula I of the invention wherein $R^5$ and $R^6$ are hydrogen:

| X | $R^1$ | $R^2$ | $R^3$ | $R^4$ | M.P. (° C.) | Physical form |
|---|---|---|---|---|---|---|
| Cl | H | H | $CH_3$ | $CH_3$ | Above 300° | White crystals. |
| Cl | H | $CH_3$ | $CH_3$ | $CH_3$ | 180° (decomposed) | Do. |
| Cl | H | $C_2H_5$ | $CH_3$ | $CH_3$ | 163.5–164.5° (decomp.) | Do. |
| Cl | H | $1-C_3H_7$ | $CH_3$ | $CH_3$ | 189.5–190.5° (decomp.) | Do. |
| $OCH_3$ | H | $C_2H_5$ | $CH_3$ | $CH_3$ | 133–134° (decomp.) | Do. |
| $OCH_3$ | H | $CH_3$ | $CH_3$ | $CH_3$ | 165.5–166.5° (decomp.) | Do. |
| $SCH_3$ | H | $CH_3$ | $CH_3$ | $CH_3$ | 171–172° (decomp.) | Do. |
| $SCH_3$ | H | $(CH_2)_3OCH_3$ | $CH_3$ | $CH_3$ | 169.5–170.5° (decomp.) | Do. |
| $SCH_3$ | H | $C_2H_5$ | $CH_3$ | $CH_3$ | 159–160° (decomp.) | Do. |
| Cl | H | $C_2H_5$ | $CH_3$ | $C_2H_5$ | 200° (decomp.) | Do. |
| $N_3$ | H | $C_2H_5$ | $CH_3$ | $CH_3$ | 124° (decomp.) | Do. |

UTILITY

The compounds of the invention, as already pointed out, have superior herbicidal properties and can be used both as pregermination and postgermination herbicides. They will affect the plant growth even in very small concentrations. Depending on the type of $R^1$ to $R^6$ substituents, they can be used for destroying or selectively suppressing weeds from an environment of cultivated plants, or they may serve to completely destroy or prevent undesirable plant growth.

The compounds of the invention can also be used for defoliation, for reduction of the fruition, delayed blossoming, etc. They can be used singly or in a mixture of different compounds of the invention or in a mixture with other type herbicides. They can also be used in admixture with insecticides, fungicides and fertilizers.

The compounds are mostly crystalline substances which have a very good solubility in many organic solvents.

Particularly, the 6-chloro-s-triazine compounds have a high degree of selectivity, for instance in corn plantations.

They are similar in this respect to the 2,4-bis-ethylamino-6-chlorotriazine. They have, in particular, the important feature that their persistence in the ground is comparatively low. They are decomposed in the ground within a period of one plantation period to substances without herbicidal effects. It is therefore not necessary again to plant corn in the same ground in the subsequent year.

The following examples will further illustrate the invention.

EXAMPLE 1

10 parts 2-ethylamino-4-(1-methyl-1-thiocarbamoyl-ethyl)-amino-6-chlorotriazine, 89 parts bentonite, and 1 part of a highly dispersed silicic acid that had been produced by a pyrogenic process were ground in a ball mill until a fine dust was formed. This mixture was found useful for application by dusting.

EXAMPLE 2

10 parts 2-methylamino-4-(1-methyl-1-thiocarbamoyl-n-propyl)-amino-6-chlorotriazine and 90 parts of diatomaceous earth were ground in a ball mill until an extremely high degree of fineness was obtained. This mixture was likewise found applicable by dusting.

EXAMPLE 3

20 parts isopropylamino-4-(1-methyl-1-thiocarbamoyl-ethyl)-amino-6-methyl-mercaptotriazine, 70 parts chlorobenzene and 10 parts of a octylphenylpolyglycolether formed by reacting di-t-butyl-phenyl and 10 to 12 mol ethyleneoxide ("Hostapal CV") were mixed together. This composition, after addition of water, formed a stable dispersion.

EXAMPLE 4

25 parts of isopropylamino-4-(1-methyl-1-thiocarbamoylpropyl)-amino-6-chlorotriazine in 150 parts cyclohexanole, 15 parts xylene and 10 parts of a substituted naphthalindisulfoacid, such as "Nekal BX," were mixed together upon addition of water. This mixture formed a stable emulsion.

EXAMPLE 5

50 parts 2-ethylamino-4-(1-methyl-1-thiocarbamoylpropyl)-amino-6-methoxytriazine were dissolved in 450 parts kerosine. The solution was found useful as such for spraying purposes.

EXAMPLE 6

22.2 g. 2-methylamino-4-(1-methyl-1-cyanoethyl)-amino-6-methoxytriazine were dissolved in a mixture of 100 ml. pyridine and 10 ml. triethylamine. Hydrogen sulfide was then introduced into the mixture at a temperature between 50 and 60° C. up to saturation. The mixture was allowed to stand overnight and the crystalline solidified contents of the flask were then poured into water. The precipitate was subjected to suction, washed thoroughly with water and dried in a vacuum at 50° C. There were thus obtained 23.7 g. 2-methylamino-4-(1-methyl-1-thiocarbamoylethyl)-amino-6-methoxytriazine. M.P. 165.5–166.5° C. Yield: 92.5% of the theoretical yield. The product was in the form of light yellow crystals.

EXAMPLE 7

29.6 g. 2-γ-methoxypropylamino-4-(1-methyl-1-cyanoethyl)-amino - 6 - methyl-mercaptotriazine were treated with hydrogen sulfide in pyridine/tributylamine in the manner described in Example 6. There were thus obtained 30.1 g. 2-γ-methoxypropylamino-4-(1-methyl-1-thiocarbamoylethyl)-amino - 6 - methylmercaptotriazine in the form of white crystals. M.P. 169.5–170.5° C. Yield: 91.2% of the theoretical yield.

EXAMPLE 8

184.5 g. (1 mol) cyanuric chloride was dissolved in 2 l. acetonitrile. 236 g. (2 mols) finely pulverized α-aminoisobutyricacidthioamide (M.P. 109° C.) were then added while the solution cooled to 0 to 2° C. A brilliant white precipitate formed immediately. The solution was stirred for 3 hours at a temperature up to 20° C. and subsequently concentrated by evaporation to dryness. The crystalline residue was treated with ice-water, removed by suction and dried in a vacuum at 30° C. There were obtained yellow-white crystals which decomposed slowly above 160° C.

*Analysis.*—$C_7H_9N_5SCl_2$ (mol. wt. 266). Theoretical (percent): C, 31.6; H, 3.4; N, 26.3; S, 12; Cl, 26.7. Found (percent): C, 31.4; H, 3.2; N, 26.1; S, 11.8; Cl, 26.4.

EXAMPLE 9

26.6 g. 2,4-bis-chloro-6-(1-methyl-1-thiocarbamoylethyl)-aminotriazine were suspended in 100 ml. acetone. 9 g. of a 50% ethylamine solution were then added dropwise at a temperature between 20 and 30° C. while stirring. Subsequently, 50 ml. of a 2 N NaOH solution were added. The final temperature was allowed to go up to 40 to 45° C. The solution was stirred until a pH of 7 was reached and the acetone was then distilled off in a vacuum. A thick crystal slurry was left which was removed by suction and washed with water. Drying was effected in a vacuum at 40° C. The yield was 25.15 g. 2-chloro-4-(1-methyl - 1 - thiocarbamoyl - ethyl) - amino - 6 - ethylamino-s-triazine (equal to 91.6% of the theoretical value) in the form of white crystals; M.P. 163.5–164.5° C. (decomposition).

*Analysis.*—$C_9H_{15}N_6SCl$ (mol. wt. 274.5). Theoretical (percent): C, 39.3; H, 5.5; N, 30.6; S, 11.6; Cl, 12.9. Found (percent): C, 39.1; H, 5.7; N, 30.4; S, 11.5; Cl, 12.7.

EXAMPLE 10

184.5 g. cyanuric chloride were suspended in 1000 ml. acetonitrile and cooled to 0° C. A solution of 119 g. α-aminoisobutyricacidthioamide in 1 l. acetonitrile was then added dropwise. Subsequently, and likewise at a temperature between 0 and 2° C., 200 ml. 5 N NaOH were added. Thereafter 85 g. of a 70% isopropylamine solution was added dropwise while the temperature rose slowly to 20° C. Finally, 200 ml. 5 N NaOH were slowly added to the mixture. The final temperature was between 40 and 45° C. As soon as the mixture had become neutral, the acetonitrile was removed in a vacuum. The remaining crystal slurry was removed by suction, washed, and dried. It had a melting point of 189.5 to 190.5° C. (decomposition) and was in the form of white crystals. The total yield was 257.3 g. 2-chloro-4-isopropylamino-6-(1-methyl-1-thiocarbamoyl)-amino-s-triazine corresponding to 89.2% of the theoretical yield.

*Analysis.*—$C_{10}H_{17}N_6SCl$ (mol. wt. 288.5). Theoretical (percent): C, 41.6; H, 5.9; N, 29.1; S, 11.1; Cl, 12.3. Found (percent): C, 41.4; H, 5.8; N, 28.8; S, 11.0; Cl. 12.1.

EXAMPLE 11

27.45 g. 2-chloro-4-(1-methyl-1-thiocarbamoylethyl)-amino-6-ethylamino-s-triazine were added to a solution of 5.4 g. sodium ethylate in 200 ml. ethanol. The solution was heated for 6 hours to between 50 and 55° C. It then had a neutral reaction. It was concentrated by evaporation to dryness and taken up with water. The crystals were then removed by suction. The drying was effected at 40° C. in a vacuum. The yield was 25.1 g. 2-methoxy-4-(1-methyl-1 - thiocarbamoylethyl)-amino-6-ethylamino-s-triazine in the form of white crystals with a melting point between 133 and 134° C.

*Analysis.*—$C_{10}OH_{19}N_6SO$ (mol. wt. 270). Theoretical (percent): C, 44.4; H, 6.7; N, 31.1; S, 11.8. Found (percent): C, 44.4; H, 6.6; N, 30.9; S, 11.6.

EXAMPLE 12

25.4 g. 2-methylmercapto-4-(1-methyl-1-cyanoethyl-amino-6-ethylamino-s-triazine were dissolved in a mixture of 100 ml. pyridine and 10 ml. triethylamine. The solution was the heated to 60° C. and hydrogen sulfide was introduced into the solution at this temperature up to saturation. The solution was then allowed to stand overnight and thereafter poured into water. Soon crystallization occurred. The crystals were removed by suction, washed, dried and then recrystallized from ethanol. They were in the form of white crystals having a melting point between 159 and 160° C. The yield was 19.35 g. 2-methylmercapto-4-(1-methyl-1-thiocarbamoylethyl)-amino-6-ethylamino-s-triazine, corresponding to 67.2% of the theoretical yield.

Analysis.—$C_{10}OH_{20}H_6S_2$ (mol. wt. 288). Theoretical (percent): C, 41.6; H, 6.9; N, 29.1; S, 22.2. Found (percent): C, 41.4; H, 6.7; N, 28.8; S, 22.0.

EXAMPLE 13

In order to test the herbicidal action the compounds of the invention were prepared in the form of solutions or suspensions in a mixture of equal parts of water and acetone. The mixture in addition included 1% of octylphenylpolyglycolether ("Hostapal CV," made from di-t-butylphenol and 10–12 mol of ethyleneoxide). It also included 2% glycerine.

The compounds were tested in respect of the following plants: corn, wheat, rye grass, peas, linseed, mustard, sugar beet.

The compounds were applied in case of leaf treatment by means of a spray device with which 1 or 10 kg. per hectare (equalling 2.471 acres) of effective agent could be sprayed in a total volume of 630 liters per hour.

For treatment of the ground after planting, the plants were seeded into earth disposed in plastic bowls. The seeding and watering took place shortly prior to treatment and simultaneously with the treatment of the leaves in order to apply the same amounts of effective agent.

At the end of the test period, which was 7 days in the case of the leaf treatment and 11 days in the case of the ground treatment prior to germination, the results were visually ascertained. The phytotoxicity was graded on a scale from 0 to 9. 0 was equivalent to no effect at all and 9 to total destruction of the plant. Phytotoxicity with all 7 plant types as obtained appears from the following table together with data regarding the compositions employed. The amount of effective agent used was 1 kg./hectare (2.471 acres).

The table includes also prior art substances for comparison purposes.

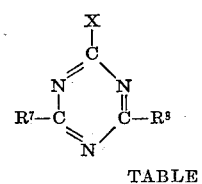

TABLE

| X | R⁷ | R⁸ | Leaf treatment | Ground treatment |
|---|---|---|---|---|
| Cl* | NHCH₃ | CH₃<br>NH—C—CSNH₂<br>CH₃ | 6 | 5.0 |
| Cl* | NHC₂H₅ | CH₃<br>NH—C—CSNH₂<br>CH₃ | 5.9 | 5.1 |
| OCH₃ | NHCH₃ | CH₃<br>NH—C—CSNH₂<br>CH₃ | 6.3 | 6.0 |
| SCH₃ | NHCH₃ | CH₃<br>NH—C—CSNH₂<br>CH₃ | 5.7 | 5.8 |
| SCH₃ | NHC₂H₅ | CH₃<br>NH—C—CSNH₂<br>CH₃ | 5.3 | 5.7 |
| Comparison compounds: | | | | |
| Cl* | NHC₂H₅ | NHC₂H₅ | 3.6 | 3.0 |
| Cl | NHC H | CH₃<br>NH—C—CONH₂<br>CH₃ | 0 | 0 |
| Cl | NHC₂H₅ | CH₃<br>NH—C—COOH<br>CH₃ | — | — |

*These compounds tolerate corn.

What is claimed as new and desired to be protected by Letters Patent is set forth in the appended claims:

1. A substituted s-triazine compound of the formula

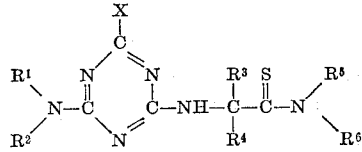

wherein

X is halogen, $N_3$, lower alkoxy or lower alkylmercapto;

R¹ and R² are the same or different and are hydrogen, straight-chain or branched alkyl or alkenyl of 1 to 4 carbon atoms, straight-chain or branched substituted alkyl or alkenyl, the substitution being halogen, OH, CN, alkoxy or alkylmercapto, with the number of carbon atoms in the last two groups being as defined before;

R³ and R⁴ are the same or different and are straight-chain or branched alkyl or alkenyl having from 1 to 8 carbon atoms or are benz-lower alkyl, and wherein R³ and R⁴ may also be interconnected to form a six-member carbon ring, and wherein either R³ or R⁴ may also be hydrogen; and R⁵ and R⁶ are the same or different and are lower alkyl or hydrogen.

2. The compound of claim 1 wherein X is chlorine.
3. The compound of claim 1 wherein X is methoxy.
4. The compound of claim 1 wherein X is mercapto.
5. The compound of claim 1 wherein the alkyl or alkenyl group in R¹ and R² is substituted by chlorine.

References Cited

UNITED STATES PATENTS 2,394,042  2/1946  D'Alelio _____ 260—249.6
3,225,191  6/1966  Dexter et al. ____ 260—249.8 X JOHN M. FORD, Primary Examiner U.S. Cl. X.R.

71—93; 260—249.6, 551 S